(12) United States Patent
Bang et al.

(10) Patent No.: US 9,624,818 B2
(45) Date of Patent: Apr. 18, 2017

(54) COOLING APPARATUS OF BUS

(71) Applicant: Hyundai Motor Company, Seoul (KR)

(72) Inventors: Jin-Seok Bang, Suwon-Shi (JP); Do-Hwan Kim, Yongin-shi (JP)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 14/550,980

(22) Filed: Nov. 22, 2014

(65) Prior Publication Data
US 2015/0226107 A1 Aug. 13, 2015

(30) Foreign Application Priority Data
Feb. 11, 2014 (KR) .................. 10-2014-0015592

(51) Int. Cl.
| | |
|---|---|
| *F01P 11/20* | (2006.01) |
| *F01P 7/10* | (2006.01) |
| *B60K 11/08* | (2006.01) |
| *B62D 31/02* | (2006.01) |
| *B62D 33/08* | (2006.01) |
| *F01P 3/18* | (2006.01) |
| *F01P 11/10* | (2006.01) |
| *B60K 11/04* | (2006.01) |
| *F01P 11/02* | (2006.01) |
| *F01P 3/22* | (2006.01) |
| *F01P 7/08* | (2006.01) |
| *F01P 9/00* | (2006.01) |

(52) U.S. Cl.
CPC .............. *F01P 7/10* (2013.01); *B60K 11/04* (2013.01); *B60K 11/08* (2013.01); *B62D 31/02* (2013.01); *B62D 33/08* (2013.01); *F01P 3/18* (2013.01); *F01P 11/10* (2013.01); *B60Y 2200/143* (2013.01); *F01P 3/22* (2013.01); *F01P 7/08* (2013.01); *F01P 9/00* (2013.01); *F01P 11/02* (2013.01); *F01P 11/029* (2013.01); *F01P 2050/22* (2013.01)

(58) Field of Classification Search
CPC .... F01P 11/029; F01P 3/22; F01P 9/00; F01P 7/08; F01P 11/02
USPC ................................................ 123/41.5
See application file for complete search history.

(56) References Cited

U.S. PATENT DOCUMENTS

| | | | |
|---|---|---|---|
| 4,113,274 A * | 9/1978 | Vahrenkamp | B60D 1/465 254/420 |
| 2007/0215078 A1* | 9/2007 | Sturman | F01L 1/28 123/90.12 |
| 2007/0215398 A1* | 9/2007 | Ferdows | B60K 1/04 180/68.4 |
| 2009/0241865 A1* | 10/2009 | Stramecki | F01P 7/048 123/41.12 |
| 2012/0215426 A1* | 8/2012 | Sato | B60K 6/46 701/108 |

FOREIGN PATENT DOCUMENTS

| | | |
|---|---|---|
| JP | 2009-184377 A | 8/2009 |
| KR | 10-0219027 B1 | 6/1999 |

\* cited by examiner

*Primary Examiner* — Hung Q Nguyen
*Assistant Examiner* — Charles Brauch
(74) *Attorney, Agent, or Firm* — Morgan, Lewis & Bockius LLP

(57) ABSTRACT

A cooling system for a bus may include a heat dissipating plate mounted on a roof panel of a top of a bus and cooling heated fluid with wind, and an actuator connected to an air tank, selectively actuating the heat dissipating plate and adjusting an inclination angle between the heat dissipating plate and the roof panel.

3 Claims, 5 Drawing Sheets

COOLING APPARATUS OF BUS

CROSS-REFERENCE TO RELATED APPLICATION

The present application claims priority to Korean Patent Application No. 10-2014-15592 filed Feb. 11, 2104, the entire contents of which is incorporated herein for all purposes by this reference.

BACKGROUND OF THE INVENTION

Field of the Invention

The present invention relates to a cooling apparatus of a bus, and more particularly, to a cooling system for a bus which includes a cooling device (heat dissipating plate or an assembly of a heat dissipating plate and heat dissipating fan) mounted on a roof panel of the top of a bus and changed in inclination angle in accordance with the driving state of the vehicle and the temperature of fluid to be cooled, in order to additionally ensure a space for the engine room and more increase cooling performance and aerodynamic performance.

Description of Related Art

Large buses are usually driven in an RR (Rear engine Rear drive) type to be able to reduce the height from the ground and relatively increase the interior so that passengers can more easily get on the buses. The RR type buses have a relatively small output loss due to a short distance between the driving shaft and the engine and are easily repaired, so most of large buses are manufactured in the RR type.

In the RR type buses, a cooling system for cooling the coolant that cools the engine, oil for lubrication which circulates through the engine and the transmission, and air to flow into the engine is mounted around the engine placed at the rear portion of the buses. A pump, an intercooler, an oil pump, and a heat dissipating fan that make the coolant flow are connected to the engine by a belt or a chain to receive torque.

However, when the specifications of the cooling system are changed with a change in the engine specifications, it might be limited to mount the cooling system in the engine room due to more strict rules on the exhaust gas. Further, an increase in size of the cooling system with an increase in performance of the engine is disadvantageous in terms of using parts in common.

Accordingly, the applicant has filed Korean Patent Application No. 10-2013-0052805, titled "cooling system mounting structure of bus", on May 10, 2013 in order to solve those problems. The cooling system disclosed in Korean Patent Application No. 10-2013-0052805 is composed of a heat dissipating plate and a heat dissipating fan and is mounted on the roof panel of a bus, cooling (coolant, oil, and intake air) with external air.

That is, as shown in FIG. 1, (in the structure disclosed in Korean Patent Application No. 10-2013-0052805) a cooling system 1 is disposed on the roof panel 101 of a bus 100 with the rear lifted up at a predetermined height than the front so that the heat dissipating plate is cooled by wind. The heat dissipating plate is provided so that coolant heated through an engine 2, intake air compressed and heated through an intercooler, or transmission oil or engine oil heated by the operation of the engine are cooled through it, and a heat dissipating fan is additionally mounted ahead of or behind the heat dissipating plate to improve the cooling performance.

In the structure, it was possible to increase spatial usability of the engine room by changing the position of the cooling system, and it was possible to improve the cooling performance because the heat dissipating plate is brought in direct contact with wind.

However, in this structure, it is possible to increase the cooling performance (with an increase in the inclination angle between the cooling system and the roof panel), but the air resistance is proportionally increased, so that the fuel efficiency is bad (the larger the inclination angle, the more the aerodynamic performance decreases). The air resistance should be improved because it increases in proportion to the vehicle speed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling system for a bus which can vary an inclination angle of a heat dissipating plate (or inclination angles of both of a heat dissipating plate and a heat dissipating fan on a front or rear side of the heat dissipating plate) under a predetermined logic, depending on the speed of the bus and the temperature of coolant (or oil or intake air that is cooled through the heat dissipating plate).

According to various aspects of the present invention, a cooling system for a bus may include a heat dissipating plate mounted on a roof panel of a top of a bus and cooling heated fluid (that is, coolant, engine oil, transmission oil, and intake air heated by an intercooler etc.) with wind, and an actuator connected to an air tank, selectively actuating the heat dissipating plate and adjusting the inclination angle between the heat dissipating plate and the roof panel.

The actuator may reciprocate a piston longitudinally in a cylinder, and the piston may adjust the inclination angle by moving up and/or down a rear side of the heat dissipating plate, with a front side of the heat dissipating plate being rotatable on the roof panel.

The actuator may adjust a reciprocation distance of the piston in accordance with a predetermined control logic receiving a speed of the bus and a temperature of fluid flowing into the heat dissipating plate as variables.

The inclination angle between the heat dissipating plate and the roof panel may be in a range of 0° to 30°.

The fluid that is cooled by the heat dissipating plate may be one or more selected from coolant heated or intake air compressed and heated by the engine and oil heated by the operation of the engine.

A heat dissipating fan sending external air to the heat dissipating plate may be additionally provided and a rotation speed of the heat dissipating fan may also be controlled by the controller in accordance with a predetermined control logic receiving the speed of the bus and the temperature of the fluid flowing into the heat dissipating plate as variables.

According to the present invention having the configuration described above, since the inclination angle a of the heat dissipating plate changes in accordance with the vehicle speed and/or the temperature of fluid, it is possible to improve both of the cooling performance and the aerodynamic performance that are the maximum under opposite conditions.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
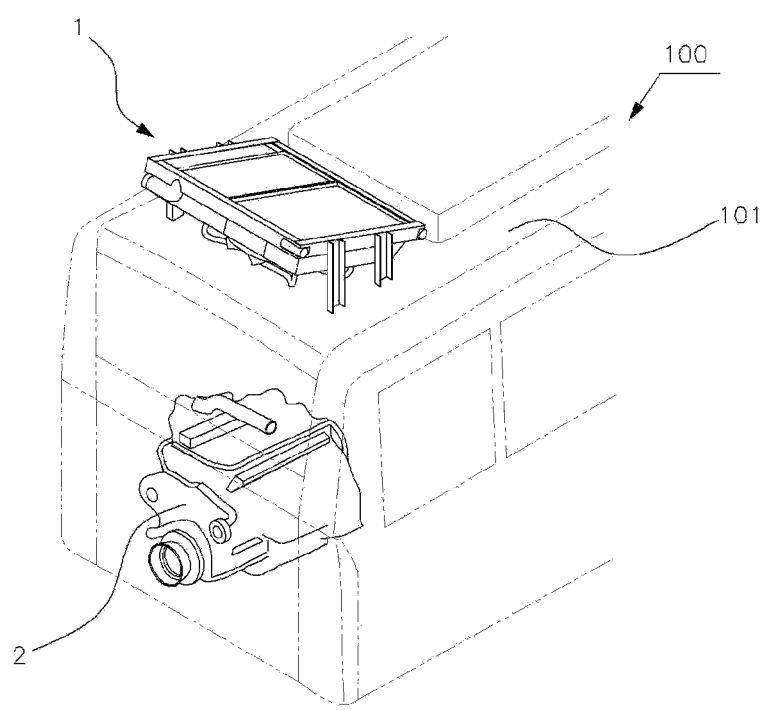
FIG. 1 is a view showing a heat dissipating plate mounted on a roof panel of a bus according to the related art.

In the figures, reference numbers refer to the same or equivalent parts of the present invention throughout the several figures of the drawing.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2A:
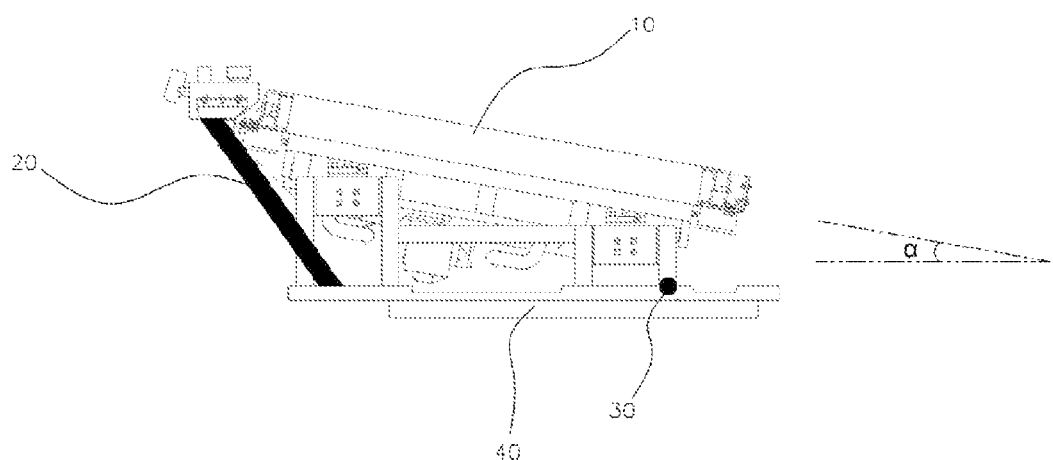
FIG. 2A, FIG. 2B, and FIG. 2C are views showing an exemplary heat dissipating plate on the roof panel of a bus, an actuator moving up/down the exemplary heat dissipating plate, and a hinge device combined with the front end of the exemplary heat dissipating plate, according to the present invention.
Figure 2B:
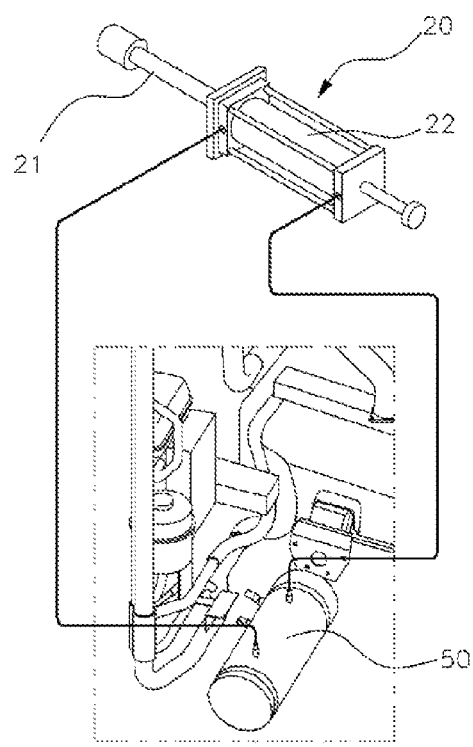
Figure 2C:
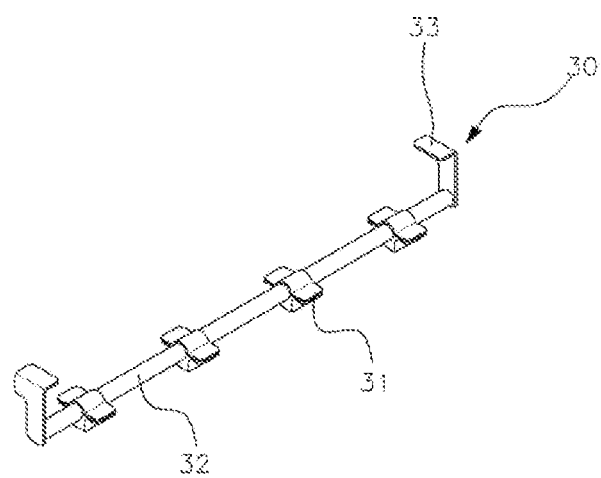
Figure 3:
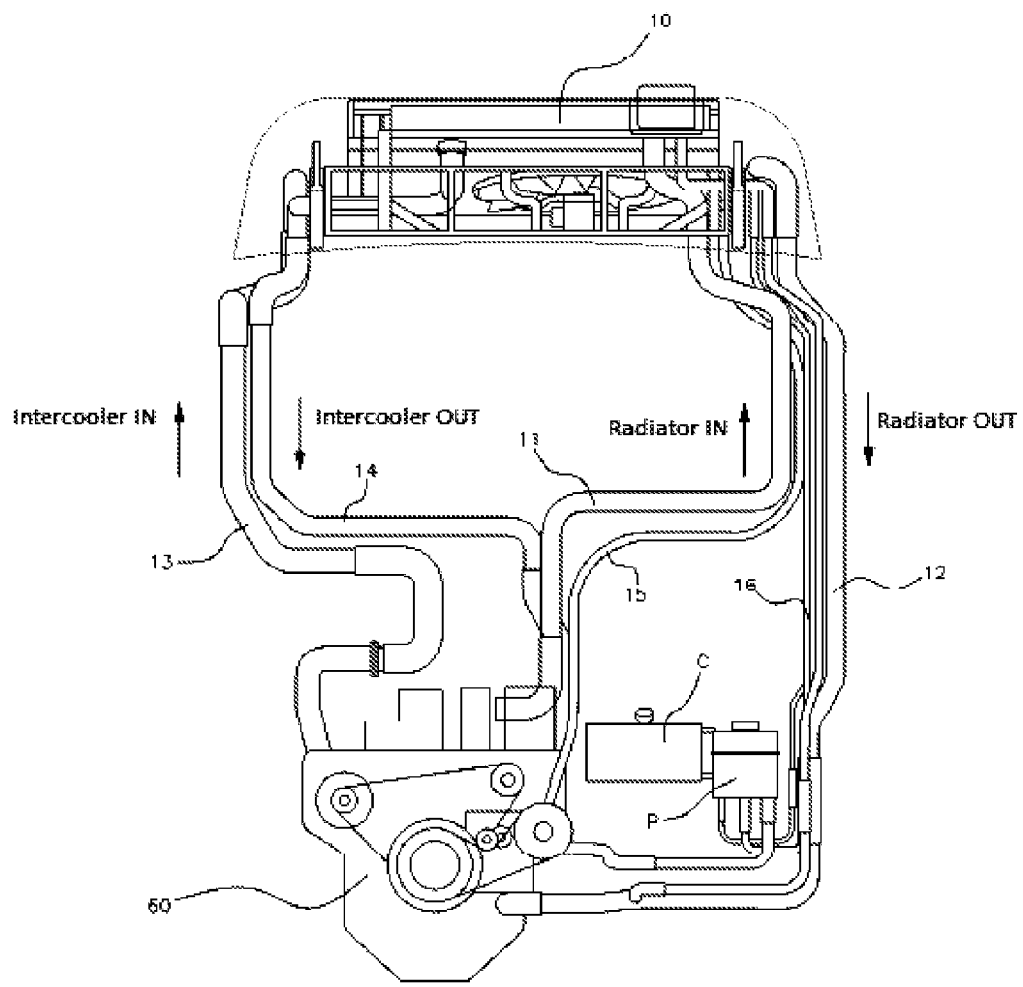
FIG. 3 is a view showing lines that are connected to the exemplary heat dissipating plate and through which fluid is delivered, according to the present invention.

Referring to FIGS. 2A-2C, in various aspects of the present invention, a heat dissipating plate 10 through which fluid heated by the operation of an engine such as coolant, engine oil, or transmission oil, and intake air heated through an intercooler is cooled and discharged is mounted on a roof panel 40 of a top of a bus. The front (the right side in FIGS. 2A-2C) of the heat dissipating plate 10 can be turned by a hinge device 30 and an actuator 20, that adjusts the inclination angle α between the heat dissipating plate 10 and the roof panel 40, is mounted on the rear (the left side in FIGS. 2A-2C) of the heat dissipating plate 10.

The hinge device 30 includes a plurality of brackets 31 fixed to the roof panel 40, a hinge rod 32 rotatably fitted in the brackets 31, and fixing brackets 33 combined with the heat dissipating plate 10 at both ends of the hinge rod 32.

The actuator 20 of the present invention is connected to an air tank 50 (operating an air brake of the bus), reciprocates a piston 21 longitudinally in a cylinder 22, using air pressure, and adjusts the inclination angle a by making the piston 21 move up/down the rear side of the heat dissipating plate 10.

The fluid that is cooled by the heat dissipating plate 10 may be one or more selected from coolant heated, intake air compressed and heated by the engine 60, or oil heated by the operation of the engine.

In various aspects of the present invention, three separate heat dissipating members are provided in the heat dissipating plate 10. The heat dissipating members are lines 13 and 14 through which the intake air heated by the intercooler flows in/out, lines 11 and 12 through which the coolant heated by the engine flows in/out, and lines 15 and 16 through which the oil heated by the engine or the transmission flows in/out through an oil pump P, which are connected respectively.

The controller C that controls the actuator 30 receives information on vehicle speed and temperature of the fluid flowing into the heat dissipating plate 10 from sensors on the vehicle and adjusts the reciprocation distance of the piston 21 in accordance with a predetermined control logic.

Further, in the present invention, a heat dissipating fan may be additionally provided to increase the amount of air sent to the heat dissipating plate 10. The rotation speed of the heat dissipating fan is also controlled by the controller C in accordance with a predetermined control logic receiving the speed of the bus and the temperature of the fluid flowing into the heat dissipating plate 10 as variables. The heat dissipating fan is attached to the front side or the rear side of the heat dissipating plate 10 to generate the same inclination angle as the heat dissipating plate 10 in accordance with the operation of the actuator 30.

Figure 4:
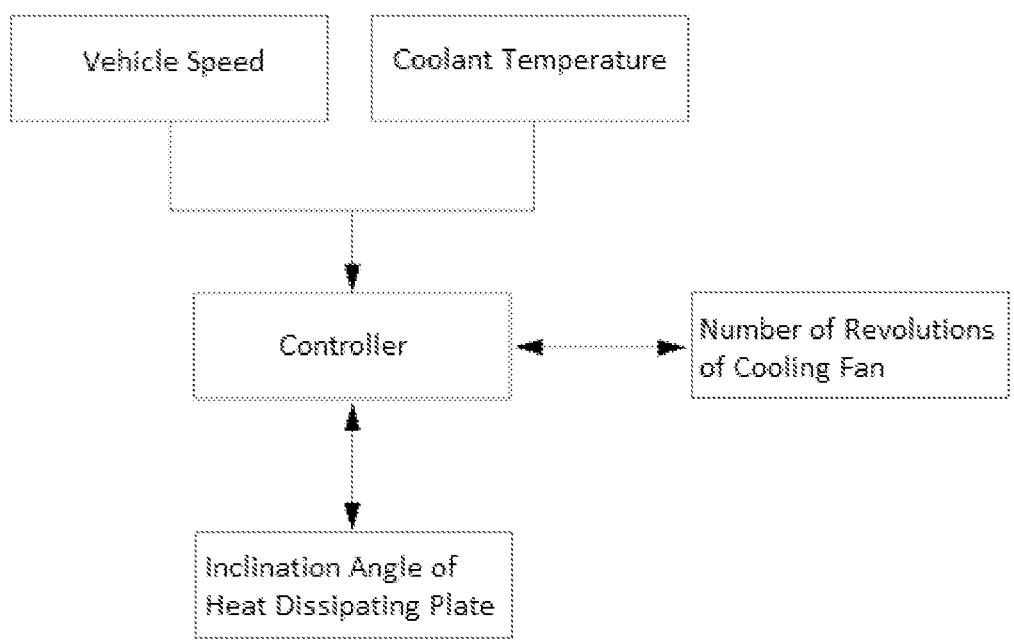
FIG. 4 is a view showing a controller electrically connected to control a number of revolutions of a heat dissipating fan and an inclination angle of the exemplary heat dissipating plate in response to signals about a vehicle speed and a temperature of coolant according to the present invention.

Accordingly, the controller C, as shown in FIG. 4, is electrically connected to the heat dissipating fan and the actuator 20 to adjust the number of revolutions of the heat dissipating fan and the inclination angle of the heat dissipating plate 10 in accordance with a predetermined logic, when the data of vehicle speed and coolant temperature is inputted. The control logic, which is determined in accordance with the specifications of the vehicle and various conditions, is set to achieve the optimum cooling performance and aerodynamic performance on the basis of the data obtained from a test, as in the following Table 1.

TABLE 1

| | Inclination angle of heat dissipating plate (α) | Rotation speed of heat dissipating fan (rpm) |
|---|---|---|
| vehicle speed < 40 KPH and coolant temperature < 85° C. | 0° | 0 rpm |

TABLE 1-continued

| | Inclination angle of heat dissipating plate (α) | Rotation speed of heat dissipating fan (rpm) |
|---|---|---|
| vehicle speed < 40 KPH and 85° C. < coolant temperature < 95° C. | 10°~30° | 450 rpm~ |
| vehicle speed < 40 KPH and coolant temperature > 95° C. | ~30° | ~900 rpm |
| vehicle speed > 40 KPH and coolant temperature < 85° C. | 20°~ | 650 rpm~ |
| vehicle speed > 40 KPH and 85° C. < coolant temperature < 95° C. | 5°~20° | 450 rpm~650 rpm |
| vehicle speed > 40 KPH and coolant temperature > 95° C. | 0° | ~450 rpm |

The cooling system of the present invention which has the configuration described above has an effect of being able to improve both of cooling performance and aerodynamic performance that are in inverse proportion to each other. That is, since the system is configured to control the inclination angle of the heat dissipating plate 10 and the number of revolutions of the heat dissipating fan on the basis of the vehicle speed signal and the temperature signal of the fluid (flowing into the heat dissipating plate 10), it is possible to improve the cooling performance by increasing the inclination angle of the heat dissipating plate 10 while the vehicle is driven at a low speed and to improve the aerodynamic performance by decreasing the inclination angle of the heat dissipating plate 10 while the vehicle is driven at a high speed. Further, since the number of revolutions of the heat dissipating fan is controlled with the inclination angle of the heat dissipating plate 10, it is possible to achieve a system having the optimum cooling performance and aerodynamic performance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A cooling system for a bus, comprising:
a heat dissipating plate comprising cooling fluid for wind cooling, wherein the heat dissipating plate is mounted on a roof panel of a top of the bus
an actuator connected to an air tank, selectively actuating the heat dissipating plate and adjusting an inclination angle between the heat dissipating plate and the roof panel,
wherein the actuator includes a cylinder and a piston disposed in the cylinder and connected to the heat dissipation plate and reciprocates the piston longitudinally in the cylinder, and the piston adjusts the inclination angle by moving up and or down a rear side of the heat dissipating plate, with a front side of the heat dissipating plate being rotatable on the roof panel,
wherein the actuator adjusts a reciprocation distance of the piston in accordance with a predetermined control logic receiving a speed of the bus and a temperature of the fluid flowing into the heat dissipating plate as variables, and
wherein the inclination angle is increased when the bus is driven at a lower speed than a predetermined speed, and the inclination angle is decreased when the bus is driven at a higher speed than the predetermined speed.

2. The cooling system of claim 1, wherein the inclination angle between the heat dissipating plate and the roof panel is in a range of 0° to 30°.

3. The cooling system of claim 2, wherein a heat dissipating fan is configured to send external air to the heat dissipating plate and a rotation speed of the heat dissipating fan is controlled in accordance with a predetermined control logic.

* * * * *